United States Patent
Arm et al.

(10) Patent No.: US 6,275,928 B1
(45) Date of Patent: Aug. 14, 2001

(54) MICROPROCESSOR INSTRUCTION PIPELINE HAVING INHIBIT LOGIC AT EACH STAGE

(75) Inventors: Claude Arm, St Martin; Jean-Marc Masgonty, Corcelles; Christian Piguet, Neuchatel, all of (CH)

(73) Assignee: CSEM Centre Suisse D'Electronique et de Microtechnique S.A., Neuchatel (CH)

( * ) Notice: Subject to any disclaimer, the term of this patent is extended or adjusted under 35 U.S.C. 154(b) by 0 days.

(21) Appl. No.: 09/011,543

(22) PCT Filed: Jul. 30, 1996

(86) PCT No.: PCT/FR96/01203

§ 371 Date: May 21, 1998

§ 102(e) Date: May 21, 1998

(87) PCT Pub. No.: WO97/05545

PCT Pub. Date: Feb. 13, 1997

(30) Foreign Application Priority Data

Jul. 31, 1995 (FR) .................................................. 95 09316

(51) Int. Cl.$^7$ ....................................................... G06F 9/30
(52) U.S. Cl. ............................................. 712/219; 712/25
(58) Field of Search ............................. 712/25, 201, 208, 712/218, 219, 225

(56) References Cited

U.S. PATENT DOCUMENTS

| 4,658,355 | * | 4/1987 | Hatakeyama et al. ................ 712/4 |
| 4,980,817 | * | 12/1990 | Fossum et al. . |
| 5,835,753 | * | 11/1998 | Witt ..................................... 713/600 |

FOREIGN PATENT DOCUMENTS

| 0569312 | * | 11/1993 | (EP) . |
| 0 569 312 | | 11/1993 | (EP) . |
| 0638858 | * | 2/1995 | (EP) . |
| 0 638 868 | | 2/1995 | (EP) . |

OTHER PUBLICATIONS

Earnst, "Long pipelines in single–chip digital signal processors—concepts and case study", 1/91, pp. 100–108.*

IBM, "Reducing the power dissipation of processors on large CMOS chips", 7/93, pp. 405–406.*

IMB, "Reducing the power dissipation of processors on large CMOS chips.", IBM TDB, vol. 36, No. 07, 7/93, pp. 405–406.*

Ernst, Rolf, "Long Pipelines in Single–Chip Digital Signal Processors—Concepts and Case Study," *IEEE Transactions on Circuits and Systems*, vol. 38, No. 1, Jan. 1991, New York, pp. 100–108.

"Reducing the Power Dissipation of Processors on Large CMOS Chips," *IBM Technical Disclosure Bulletin*, vol. 36, No. 07, Jul. 1993, pp. 405–406.

"Processor Control Using Cycle Types," *IBM Technical Disclosure Bulletin*, vol. 28, No. 8, Jan. 1986, pp. 3260–3265.

* cited by examiner

Primary Examiner—John F. Niebling
Assistant Examiner—Stacy Whitmore
(74) Attorney, Agent, or Firm—Connolly Bove Lodge & Hutz (57) ABSTRACT

The disclosure relates to microprocessors and, more particularly, to a system for organizing and a method for the sequencing of the circuits of a microprocessor. The instruction registers are connected in chains and an inhibiting device is associated with each instruction register. Each inhibiting device has its inputs connected to the inputs of the associated register and to the clock circuit a provides and signal for the loading of the associated instruction register when it detects a predetermined combination of digits in the associated register.

5 Claims, 7 Drawing Sheets

FIG. 2I  READING REGS/RAM

FIG. 2J  MREG

FIG. 2K  ACTIVATION IR$_3$

FIG. 2L  IR$_3$ /SREG

FIG. 2M  OUTPUTS FL/ALU

FIG. 2N  RECORDING REGS/RAM

MICROPROCESSOR INSTRUCTION PIPELINE HAVING INHIBIT LOGIC AT EACH STAGE

BACKGROUND OF THE INVENTION

1. Field of the Invention

The invention relates to microprocessors and more particularly, in such microprocessors, to a system for organizing the electronic circuits and a method for sequencing the operations performed by these circuits so as to increase the efficiency of the circuits in terms of speed and reduction of electrical consumption.

In a microprocessor, the different instructions of a program are implemented sequentially by periodic electrical signals provided by a clock circuit. The number of cycles of the clock signals needed to perform one instruction varies from one microprocessor to another depending on the manufacturer and type of microprocessor. This number ranges from some cycles to several tens of cycles.

Consequently, microprocessor manufacturers have sought to reduce the number of cycles per instruction to the utmost. This has meant lowering the frequency of the clock signals for a given level of efficiency and, correlatively, reducing the electrical consumption which varies in the same way as the frequency.

2. Description of the Prior Art

At present, the most powerful microprocessors perform an instruction in one half-cycle. However, to achieve a performance level of this kind, they use the techniques known as "pipelining" and "parallelism". Thus, for example, an instruction is performed in four cycles but during these very same cycles, eight other instructions will be performed in parallel.

Techniques of this kind have the following drawbacks:

the pipelining technique is easy to manage during the running of a linear program but very difficult to manage when a program contains many "conditional branches" or "conditional jumps", which is the most usual case. For, should there be a conditional branch, the other instructions loaded into the pipeline structure would not be performed. It would therefore become necessary to fill the pipeline structure again, entailing a great loss of efficiency;

an architecture of this kind leads to a greater complexity and to an increase in the volume of the hardware used: this does not make for a sound compromise between the surface area of the integrated circuits and the efficiency of the unit;

an architecture of this kind, following the loss of efficiency due to the pipeline structure and the increase in the volume of hardware leads to a greater electrical consumption.

The object of the present invention therefore is to achieve a system for organizing the electronic circuits of a microprocessor and a method of sequencing the operations performed by these circuits resulting in greater efficiency of the microprocessor, namely in a small number of clock cycles per instruction, a small cycle period, namely a high clock frequency and a low electrical consumption.

SUMMARY OF THE INVENTION

The invention is characterized chiefly by the fact that the loading of each instruction register of each stage of the pipeline structure of the microprocessor is activated by a clock signal, the application of which to the relevant register is conditioned by a signal resulting from the decoding of the instruction contained in the instruction register that precedes it in the chain of the instruction registers.

As a result of this architecture, an instruction register of the chain of registers is activated or loaded by a clock signal only if the instruction contained in the previous instruction register provides for it. Thus, only the instruction registers that are needed for the execution of a program will be activated or loaded.

The invention therefore relates to a microprocessor comprising a chain of instruction registers, wherein at least one output terminal of each instruction register is connected to a decoding circuit, the output terminal of which is connected to the clock signal input terminal of the instruction register that follows it in the chain by means of a logic circuit that receives the clock signal.

The invention relates more specifically to a microprocessor of the type comprising at least one program memory that is addressed by a program counter by means of an addressing circuit and that provides an instruction code at its output terminals when it is addressed, at least one instruction register of the type with loading activated by a clock signal applied to a clock signal input terminal in which the instruction code read in the program memory has to be recorded and a clock circuit that provides clock signals for the sequencing of the operations performed by the microprocessor, wherein an inhibiting device having input terminals and first and second output terminals is associated with each instruction register, the input terminals of said inhibiting device being connected to the input terminals of the associated register, to the second output terminal of the preceding inhibiting device and to an output terminal of the clock circuit, the first output terminal of the inhibiting device being connected to the clock signal input terminal of the associated instruction register, the inhibiting device being designed to provide, at the first output terminal, a signal for the loading of the associated instruction register when the instruction code contains a predetermined combination of digits.

BRIEF DESCRIPTION OF THE DRAWINGS

The invention will be understood more clearly from the following description of particular exemplary embodiments, the description being made with reference to the appended figures, of which:

FIGS. 2.A to 2.N are time diagrams corresponding to state signals that enable an understanding of the operation of the microprocessor of FIG. 1;

FIGS. 4.A to 4.N are time diagrams corresponding to state signals that enable an understanding of the operation of the microprocessor of FIG. 3.

In the figures, identical references designate the same elements with identical functions.

MORE DETAILED DESCRIPTION

Figure 1:
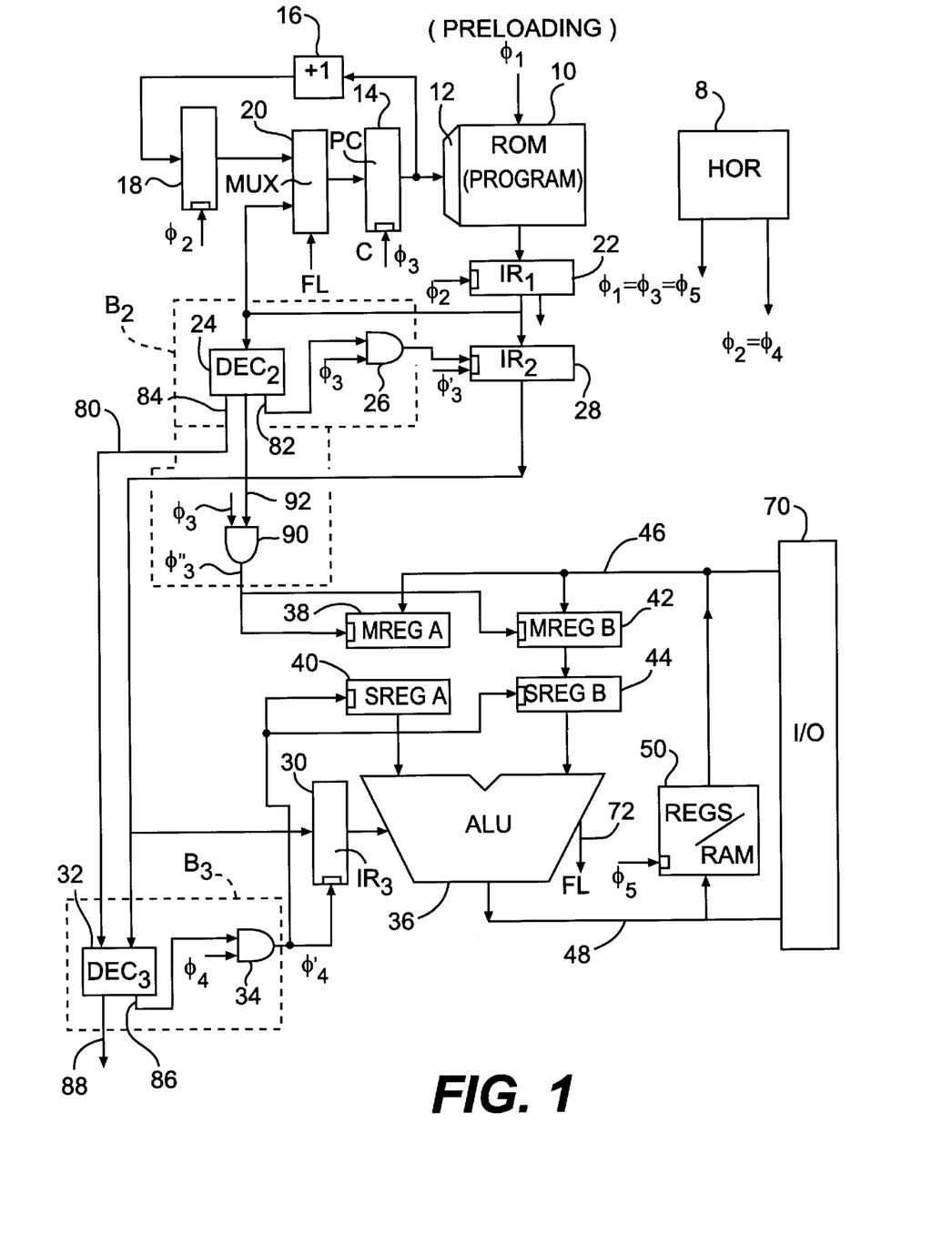
FIG. 1 is a block diagram of a first embodiment of a microprocessor implementing the invention and having only the elements needed for an understanding of the invention.

As can be seen in FIG. 1, a microprocessor to which the invention can be applied comprises a program memory 10

(also called a ROM). The memory cells of this program memory 10 are selected by an addressing circuit 12 that receives the addresses provided by a program counter 14 (also called PC). The program counter 14 jumps from one address to the next one by an operation schematically represented by the base 16 showing the algebraic digit (+1). The result of this operation is recorded in a register 18 before being applied to the program counter 14 by means of a multiplexing circuit 20 (also called MUX). This multiplexing circuit 20 receives not only codes from the register 18 but also codes from a register 22 (also called $IR_1$) which is the output register of the program memory 10 to record the instruction read in this memory. The instruction codes recorded in the register 22 are transferred into a register 28 (also called $IR_2$) before being transmitted to a register 30 (also called $IR_3$) which is the control register of an arithmetic and logic unit 36 (also called ALU).

Figure 2A:
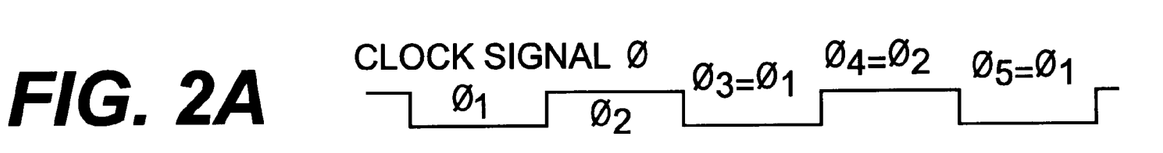
Figures 2B, 2C:
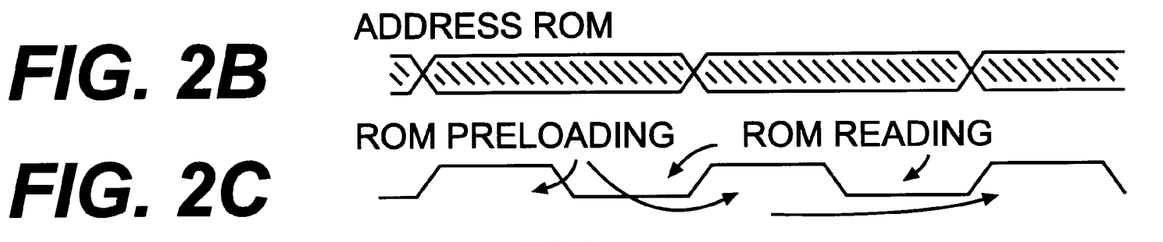
Figure 2D:
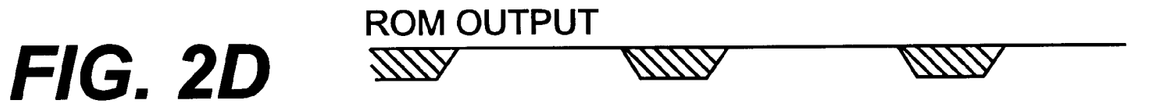
Figure 2E:
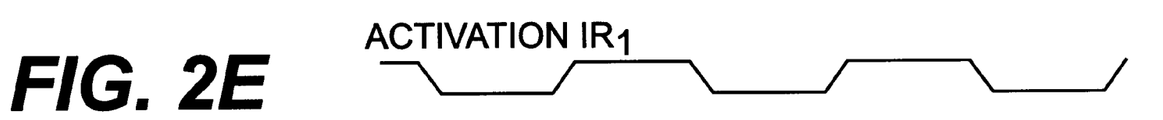
Figure 2F:
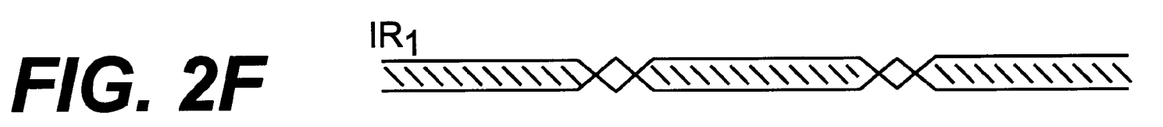
Figure 2G:
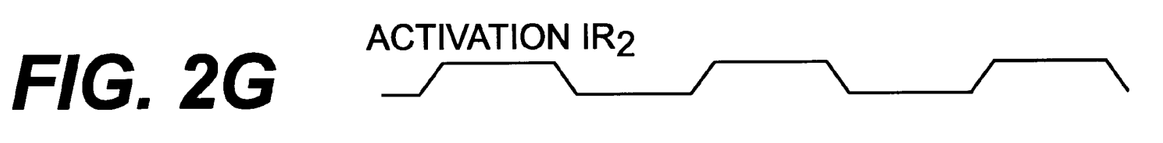

The different sequencing signals are provided by a clock circuit 8 (also called HOR). These signals are designated by $\Phi_1$, $\Phi_2$, $\Phi_3$, $\Phi_4$ and $\Phi_5$ (FIG. 2.A).

According to the invention, the transmission from the register 22 ($IR_1$) to the register 28 ($IR_2$) is conditioned by the partial decoding of the digits of the instruction code contained in the register 22 ($IR_1$). To this end, the invention provides for a decoding circuit 24 (also called $DEC_2$). The input terminals of this decoding circuit 24 are connected to the output terminals of the register 22 ($IR_1$) which are, at the same time, the input terminals of the register 28 ($IR_2$). A first output terminal 82 of the decoding circuit 24 is connected to one of the two input terminals of a gate 26 which performs the AND logic operation with the clock signal $\Phi_3$. The output terminal of the circuit 26 is connected to the input terminal of the clock signal of the register 28 ($IR_2$). Should the signal resulting from the decoding close the gate 26, this gate 26 provides a signal $\Phi'_3$ that permits the loading of the register 28 ($IR_2$) with the code contained in the register 22 ($IR_1$).

Similarly, according to the invention, the transmission from the register 28 ($IR_2$) to the register 30 ($IR_3$), namely in fact the loading of this register, is conditioned by the partial decoding of the digits of the code contained in the register 28 ($IR_2$) by means of a decoding circuit 32 (also called $DEC_3$). To this end, the output terminals of the register 28 ($IR_2$) are connected not only to the input terminals of the register 30 ($IR_3$) but also to the input terminals of a decoding circuit 32. A first output terminal 86 of the decoding circuit 32 is connected to one of the two input terminals of a gate 34 that performs the AND logic operation with the clock signal $\Phi_4$. The output terminal of the circuit 34 is connected to the clock signal input terminal of the register 30 ($IR_3$). Should the decoding signal of the signal 32 close the gate 34, this gate 34 provides a signal $\Phi'_4$ that permits the loading of the register 30 ($IR_3$).

The decoding circuit $DEC_2$ and the gate 26 constitute a first inhibiting device $B_2$. Similarly, the decoding circuit $DEC_3$ and the gate 34 constitute a second inhibiting device $B_3$.

The arithmetic and logic unit 36 (ALU) is associated in a known way with a memory 50 (also called REGS/RAM) by means of a BUS type link 48. The information elements read in the memory 50 are transmitted to the arithmetic and logic unit 36 by means of a BUS type link 46 and four registers 38, 40, 42 and 44 (also respectively called MREGA, SREGA, MREGB and SREGB).

Also in a known way, the BUS links 46 and 48 are connected to input/output circuits 70 (also called I/O circuits).

The memory 50 comprises registers as well as a memory of the Random Access Memory or RAM type.

The registers of each pair 38, 40 and 42, 44 are of the master (prefix M) and slave (prefix S) type. Their loading can be activated by the conditional clock signals $\Phi'_3$ and $\Phi'_4$ which are provided respectively by the gates 26 and 34. However, in the diagram of FIG. 1, the approach chosen is different in the sense that it is not the output signal $\Phi'_3$ of the gate 26 that is used but another signal $\Phi''_3$ prepared by a gate 90. This gate 90 has two input terminals one of which is connected to the output terminal of the clock circuit providing the signal $\Phi_3$ and the other to another output terminal 92 of the decoding circuit 24 ($DEC_2$). A signal at the output terminal 92 corresponds to a predetermined code of the instruction indicating that the arithmetic and logic unit 36 (ALU) will be used and that it is therefore necessary to load the registers 38 and 42. Thus, at the output terminal of the gate 90, there is obtained a signal $\Phi''_3$ that appears at the same time as $\Phi'_3$ and is applied to the clock signal input terminal of the registers 38 and 42.

All the registers of the diagram of FIG. 1, including those of the memory 50, are of the type with active latching to the state signal of a clock signal $\Phi$ that is applied to them. This manner of operating is represented by a rectangle in each register associated with the identification of the clock signal whether conditional or not.

The arithmetic and logic unit 36 provides so-called branch signals FL, also known as flag signals at output terminals 72. These signals are applied in particular to the multiplexing circuit 20.

The signals provided by the decoding circuits 24 and 32 may be used in the microprocessor for other purposes than that of establishing the conditions for the loading of the instruction registers 28 and 30. In particular, there is provided an electrical link 80 between the decoding circuit 24 ($DEC_2$) and the decoding circuit 32 to inform the latter that the register 28 ($IR_2$) has been loaded or not loaded. To this end, the decoding circuits 24 and 32 have two output terminals, one of them 82 or 86 for the link with the gate 26 or 34 and the other 84 or 88 for the link with the following decoding circuit such as the one referenced 32 in FIG. 1. The two outputs terminal pairs 82, 84 or 86, 88 of each decoding circuit 24 or 32 could respectively be a single output terminal if they should correspond to the decoding of one and the same number with the same polarity. However, generally speaking, the polarities of the decoding signals may have to be different and the codes to be decoded may also be different.

Figure 2H:
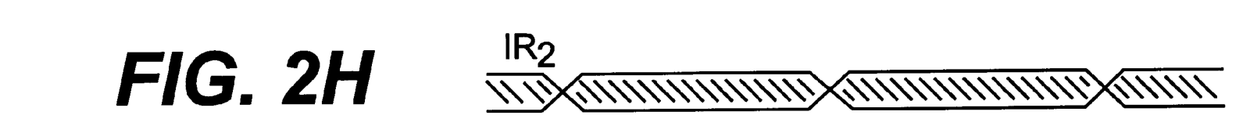
Figure 2I:
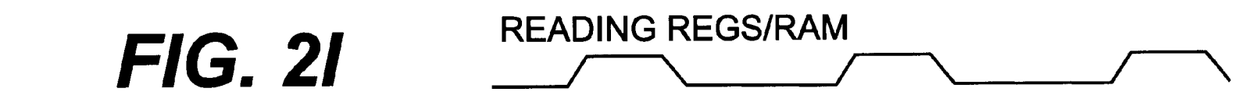
Figure 2J:
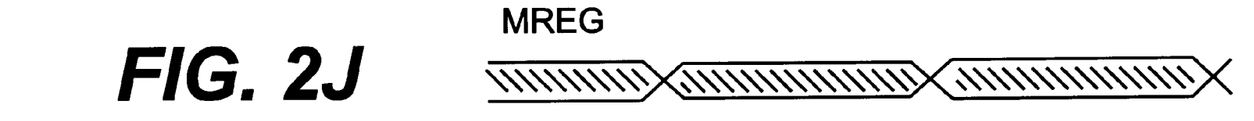
Figure 2K:
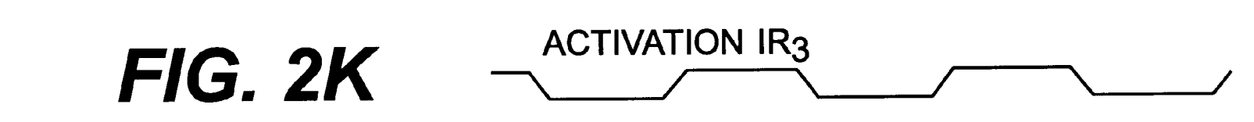
Figure 2L:
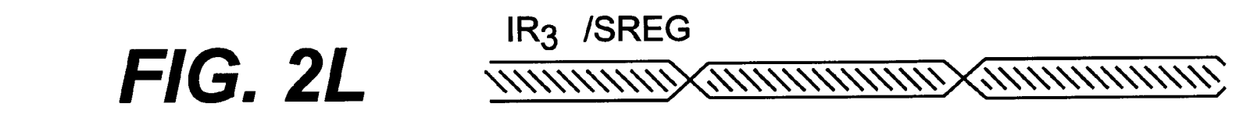
Figure 2M:
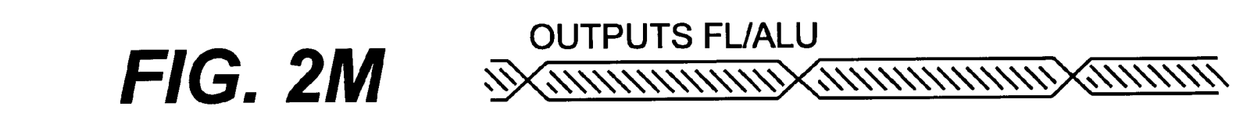
Figure 2N:
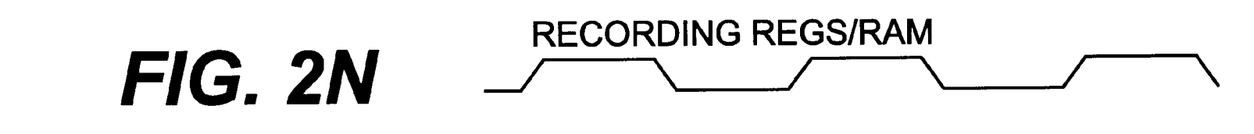

The operation of the microprocessor shown schematically in FIG. 1 shall now be explained in its relation with the features of the invention. Reference may be made here to the graphs of the signals of FIGS. 2.A to 2.N.

FIG. 2.A represents time diagrams of the cycles of the clock signal $\Phi$. Each cycle is sub-divided up into two phases: $\Phi_1$, $\Phi_2$, for the first cycle, $\Phi_3$, $\Phi_4$ for the second cycle, $\Phi_5$, ... for the third cycle, and so on and so forth. The time diagrams of FIGS. 2.A, 2.C, 2.E, 2.G, 2.I, 2.K and 2.N represent state signals while the hatched diagrams of FIGS. 2.B, 2.D, 2.F, 2.H, 2.J, 2.L and 2.M represent the values of the codes that appear at the output terminals of the different registers, the memories and the arithmetic and logic unit ALU as indicated in the time diagrams.

In the phase $\Phi_1$ (FIG. 2.A), the ROM (FIG. 2.C) is preloaded with a view to its reading by the address code contained in the program counter PC (FIG. 2.B). The ROM is read during the phase $\Phi_2$ (FIG. 2.D) and its contents are recorded in the instruction register $IR_1$ (FIG. 2.F) due to the presence of the signal $\Phi_2$ (FIG. 2.E) which is applied to the clock signal input terminal of the register $IR_1$. As soon as the register $IR_1$ has been loaded, the instruction that it contains is decoded partially in the multiplexing circuit MUX so as to determine whether the instruction corresponds to a branch instruction. If this is so, the multiplexing circuit MUX chooses between the branch address and the address of the next instruction contained in the register 18 at the time $\Phi_2$. This choice is made as a function of the conditions of branching provided by the signals FL, called flag signals, provided by the arithmetic and logic unit ALU.

In the phase $\Phi_3$, a new instruction address code is loaded into the program counter PC. This new instruction address code corresponds either to the branch address or to the next address of the program. In the case of a branch, the decoding circuit $DEC_2$ does not give the signal for opening the gate 26. This means that the register $IR_2$ cannot get into a loading position to record the code contained in the register $IR_1$ (this code that is branch instruction) and therefore remains in a position of storage of the previous transfer.

Should there be no branch, the decoding circuit $DEC_2$ gives a signal for closing the gate 26 so that the register $IR_2$ gets loaded with the contents of the register $IR_1$ at the appearance of the signal $\Phi'_3$. As soon as the loading is done in the register $IR_2$ (FIG. 2.H), a partial decoding of the instruction code is performed by the circuit $DEC_3$. If, through this decoding, it is ascertained that the operation is an operation to be performed by the arithmetic and logic unit ALU, the decoding signal closes the gate 34 so that the register $IR_3$ gets into a position to load the contents of the register $IR_2$ at the appearance of the signal $\Phi'_4$ (FIG. 2.K).

The signal $\Phi'_4$ indicates an operation of the unit ALU. It is used to load the input registers 40 and 44 (FIG. 2.L) of this unit with the contents of the registers 38 and 42 (FIG. 2.J) that have been loaded beforehand by the codes read at $\Phi_3$ (FIG. 2.I) in the memory 50 through the signal $\Phi'_3$ provided by the decoding circuit 24.

The operations in the arithmetic and logic unit 36 (ALU) are performed during the phase $\Phi_4$ so that, at the end of this phase, this unit gives firstly the signals FL called flag signals, and secondly, the data code to be recorded in the memory 50 (FIG. 2.M) by means of the BUS link 48. The recording in the memory 50 is done during the phase $\Phi_5$ (FIG. 2.N).

The link 80 is designed to inform the decoding circuit 32 that the instruction register 28 ($IR_2$) has been loaded or not loaded. If the register 28 ($IR_2$) has been loaded, then the decoding circuit 32 ($DEC_3$) must determine whether the instruction in progress should continue to be performed in the next stage of the pipeline structure or whether it ends at this level. If the register 28 ($IR_2$) has not been loaded, then the decoding circuit 32 ($DEC_3$) should not give any signal because the instruction is already ended. However, since the register 28 ($IR_2$) has not been loaded, it has retained its old value. This would lead to a repeat performance of the previous instruction. To prevent a repeat performance of this kind, the next inhibiting circuit $B_3$ must be informed thereof by the signal on the link 80.

The above description of the working of the microprocessor according to the invention shows that an instruction is performed in five phases. Furthermore, only one slow operation, namely the preloading of the memory 10, the reading of the memory 10, the reading of the memory 50, the operation of the unit 36 (ALU) and the recording of the memory 50, is done per phase, each phase additionally comprising simple decoding operations. The result thereof is that the frequency of the clock signal can be high.

Since an instruction is performed in five phases, the different levels of the pipeline architecture are used to perform one instruction at each cycle. Furthermore, the way in which the branches are processed from the very first instruction register $IR_1$ leads to avoiding any loss of efficiency. There are therefore as many instructions performed as there are cycles.

The level of electrical consumption by a system of this kind is the optimum for it is only the elements useful for the performance of the instruction that function, while the others are not activated. Furthermore, the different registers $IR_2$, $IR_3$, SREGA and SREGB are loaded only when the values at their inputs are stable. This enables the different operations to be performed only with values that are free of unstable states and thus removes the need for a large number of unnecessary transitions, namely the performance of the operation several times as is the case with most microprocessors.

It must be noted that this new architecture and the sequencing that is implemented lead to perfect synchronism between the arrival of a new instruction at the unit 36 (ALU) and new data on which the instruction is performed.

Figure 3:
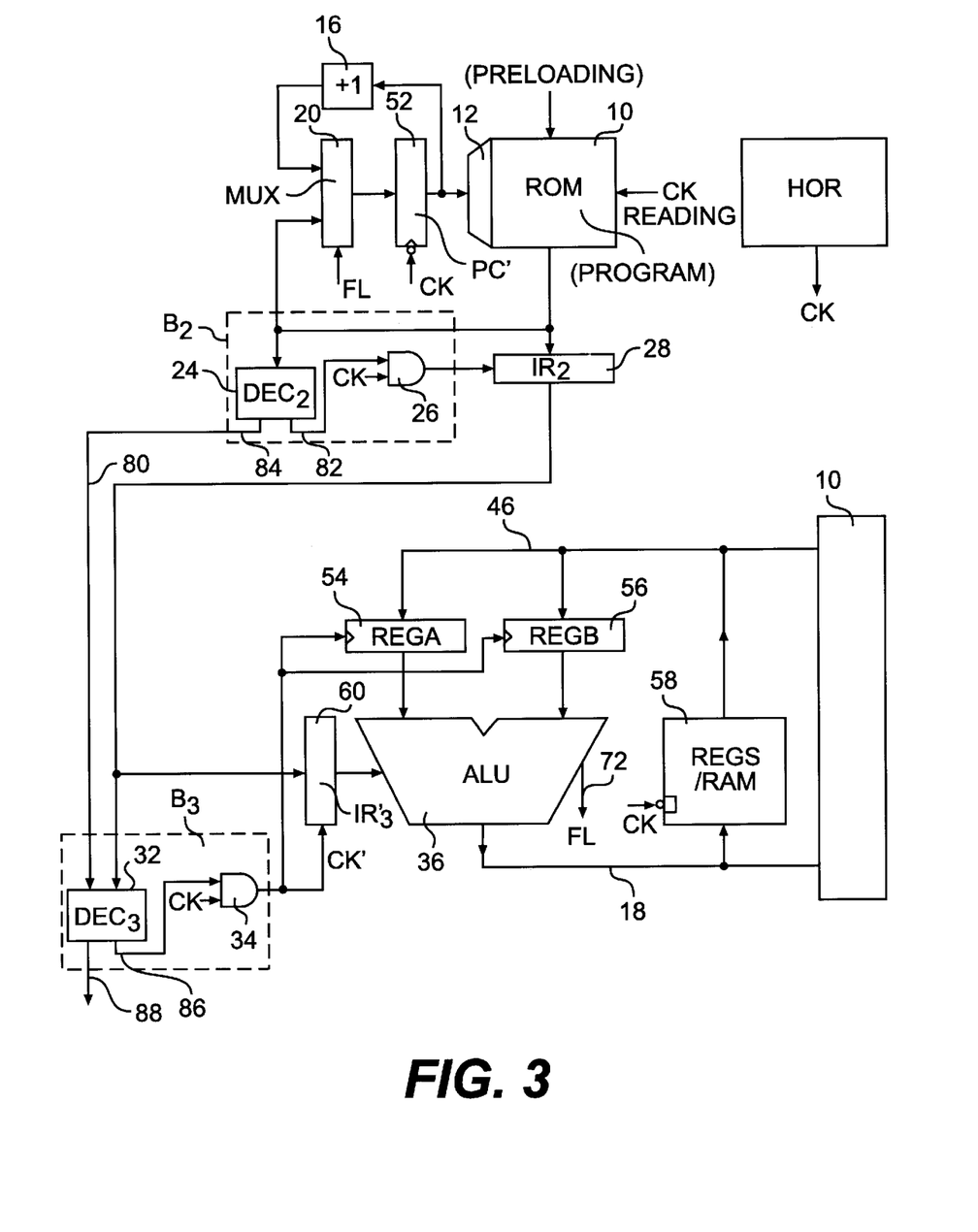
FIG. 3 is a block diagram of a second embodiment of a microprocessor implementing the invention and having only the elements necessary for an understanding of the invention.
Figure 4A:
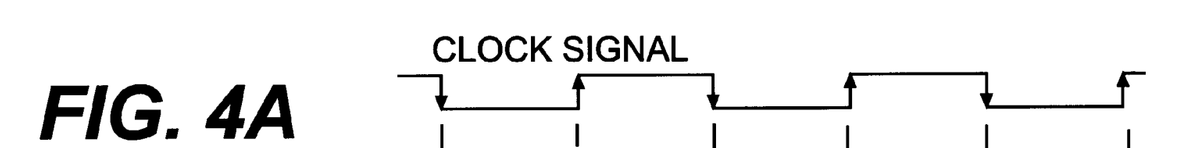
Figure 4B:
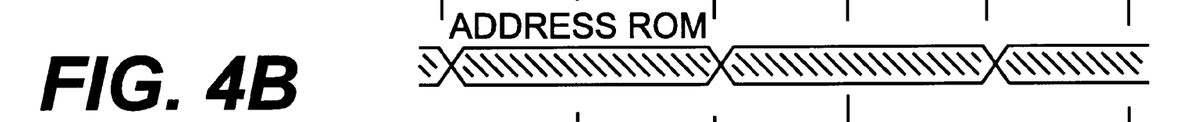
Figure 4C:
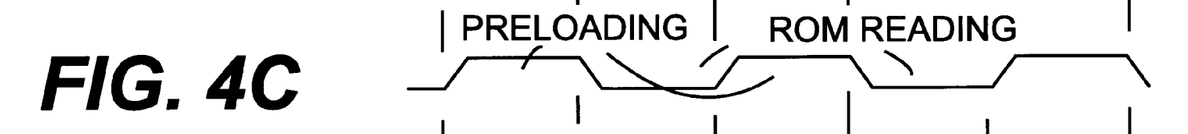
Figure 4D:
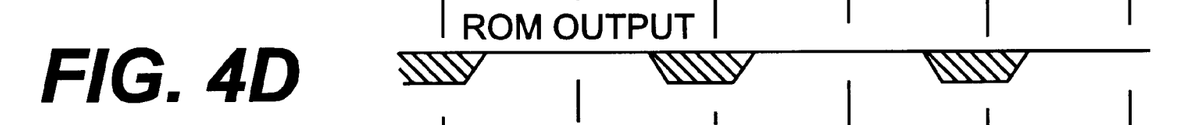
Figure 4E:
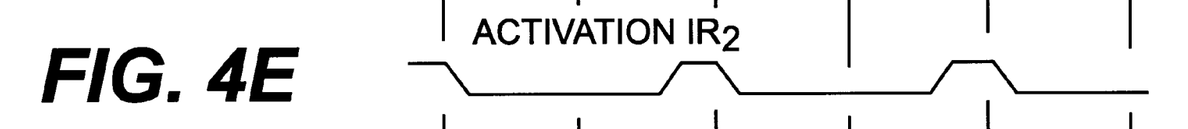
Figure 4F:
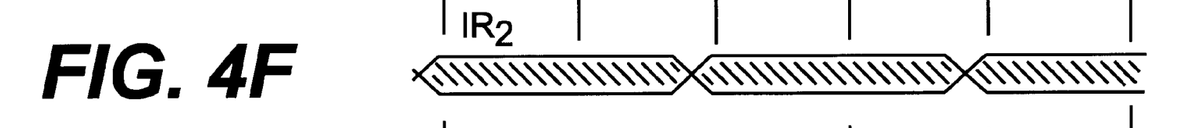
Figure 4G:
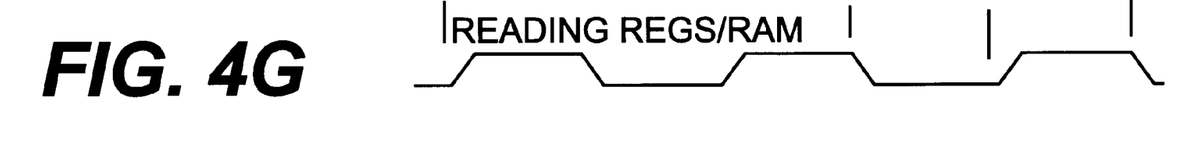
Figure 4H:
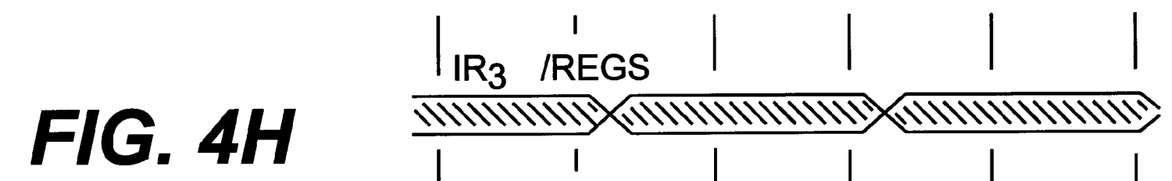
Figures 4I, 4J, 4K:
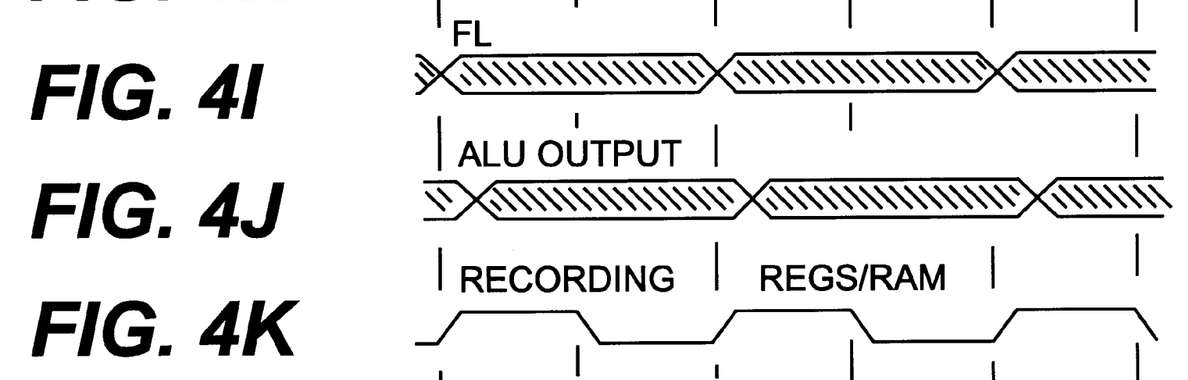
Figures 4L, 4M, 4N:
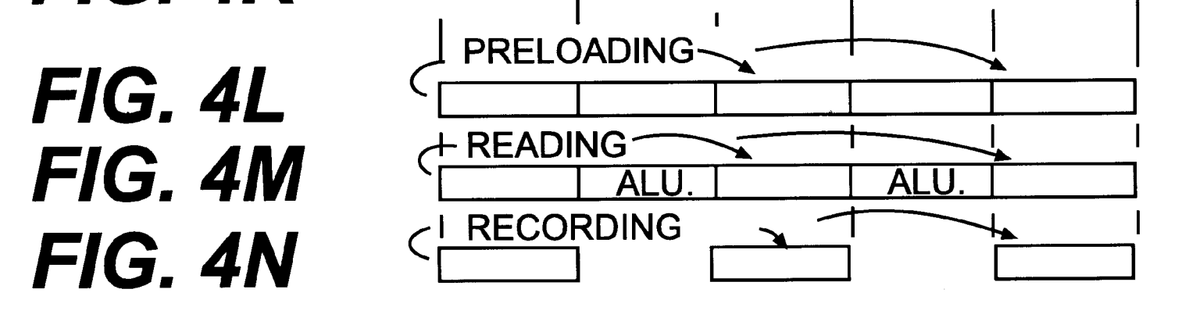

The microprocessor of FIG. 3 is different from that of FIG. 1 in the following aspects:
  the absence of the output register 22 ($IR_1$) of the memory 10, leading to the loading of the register 28 ($IR_2$) during the reading of the memory 10,
  the replacing of each pair of registers 38, 40 and 42, 44 by a single register of the flip-flop circuit type that is active on the leading edge of the clock signal ck,
  the replacing of the register 30 ($IR_3$) with active latching to the state of the signal by a register 60 ($IR'_3$) of the flip-flop circuit type that is active on the leading edge of the clock signal ck,
  the absence of the register 18 and its replacement by a program counter 52 (PC') of the flip-flop circuit type that is active on the trailing edge of the clock signal ck.

In order to remove the need to use the register 22 ($IR_1$), the memory 10 (ROM) is a preloading memory so that, at the beginning of the reading operation, all the outputs are in the state "1". It is then seen to it that all the operating codes of the branches are judiciously chosen so that a simple detection of certain "0s" automatically implies that the instruction must be loaded into the register 28 ($IR_2$).

Thus, by eliminating the register 22 ($IR_1$), energy consumption is reduced for this register is the only one that is loaded unconditionally, hence at each reading. Furthermore, the decoding by the circuit 32 ($DEC_3$) which is by far the longest operation may begin as soon as the instruction has been read, whence an increase of the frequency.

To further increase this frequency, it is also possible to extend the operations of the unit 36 (ALU) during a part of the phase $\Phi_5$ when these operations are slow, for example in the case of a parallel/parallel multiplication operation.

The microprocessor according to the block diagram of FIG. 3 operates similarly to that of the block diagram of FIG. 1 and the time diagrams of the signals are those of FIGS. 4.A to 4.K, FIGS. 4.L, 4.M and 4.N. They indicate the operations that may be performed during successive cycles in the memory 10 (FIG. 4.L), the unit 36 (FIG. 4.M) and the memory 50 (FIG. 4.N). The rectangles in bold lines indicate the routing of the information from one phase to the next one for an instruction read in the memory 10.

The two embodiments that have been described with reference to FIGS. 1 to 4 implement the invention for two instruction registers IR$_2$ and IR$_3$. However, it is clear that the invention can be applied to any number of instruction registers as can be seen in the block diagram of FIG. 5.

Figure 5:
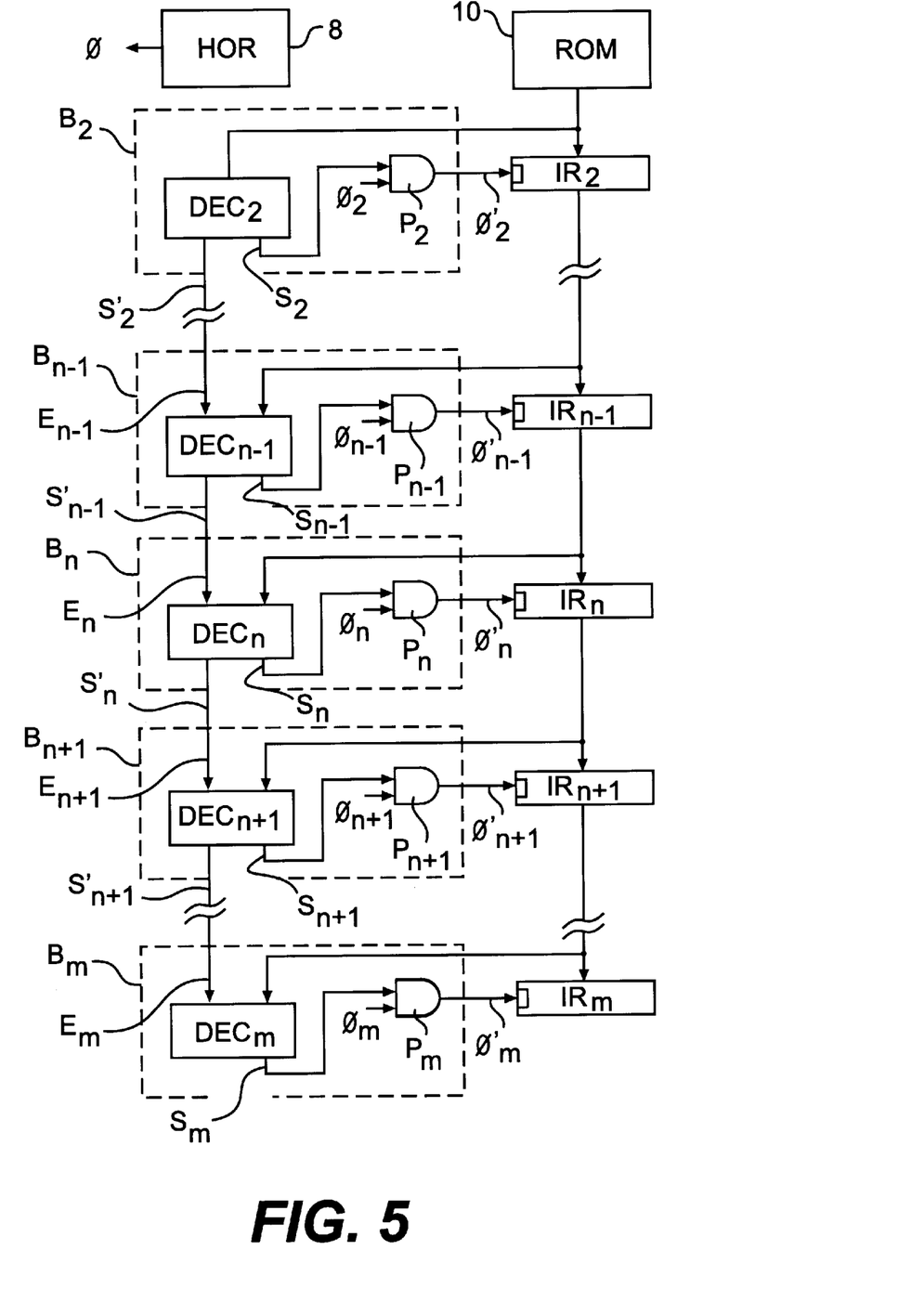
FIG. 5 is a block diagram of a chain of instruction registers of a microprocessor having the features of the invention.

In this block diagram, the (m−1) instruction registers of a chain are series-connected and only the registers IR$_2$, IR$_{n-1}$, IR$_n$, IR$_{n+1}$ and IR$_m$ have been shown, while the intermediate registers IR$_3$, . . . , IR$_{n-2}$, IR$_{n+2}$, . . . , have not been shown.

With each instruction register, there is associated an inhibiting device B$_2$, . . . , B$_{n-1}$, B$_n$, B$_{n+1}$, . . . , B$_m$ to activate the conditional loading of the concerned register. To this end, each inhibiting device has a decoding circuit DEC$_2$, DEC$_{n-1}$, DEC$_n$, DEC$_{n+1}$, . . . , DEC$_m$, the input terminals of which are connected to the output terminals of the instruction register that precedes it in the chain or the memory 10 for the first instruction register IR$_2$ of the chain. Of course, the output terminals of a register are connected to the input terminals of the next register in the chain and this is tantamount to stating that the input terminals of a decoding circuit are connected to the input terminals of the instruction register associated with it.

A first output terminal S$_2$, . . . , S$_{n-1}$, S$_n$, S$_{n+1}$, . . . , S$_m$ of each decoding circuit DEC is connected to a first terminal of a gate P (P$_2$, . . . , P$_{n-1}$, P$_n$, P$_{n+1}$, . . . , P$_m$) the other input terminal of which is connected to the clock circuit 8 (HOR) to receive the phase signal Φ$_2$, . . . , Φ$_{n-1}$, Φ$_n$, Φ$_{n+1}$, . . . , Φ$_m$ that concerns it. The output terminal of the gate P is connected to the input terminal of the clock signal of the instruction register with which the loop is associated. Should the instruction code contained in the previous register correspond to that of the decoding circuit DEC, the gate P gives a signal Φ'$_2$, . . . , Φ'$_{n-1}$, Φ'$_n$, Φ'$_{n+1}$, . . . , Φ'$_m$ for the loading of the register to which the signal is applied.

Each decoding circuit DEC$_2$, . . . , DEC$_{n-1}$, DEC$_n$, DEC$_{n+1}$, . . . , DEC$_m$ has a second output terminal S'$_2$, . . . , S'$_{n-1}$, S'$_n$, S'$_{n+1}$ that is connected to a supplementary input E$_{n-1}$, E$_n$, E$_{n+1}$, . . . , E$_m$ of the next decoding circuit in the chain of registers. This link, as explained hereabove with reference to FIGS. 1 and 3, is aimed at informing each inhibiting loop of the state of the previous inhibiting loop.

Of course, as explained with reference to the block diagram of FIG. 1, each decoding circuit may have other output terminals. Each of these other output terminals would correspond to a different decoding of all or part of the digits of the instruction code. The signals appearing at these other output terminals could be used for various purposes such as the one described with reference to FIG. 1.

The microprocessor according to the invention has the following advantages:

great efficiency because one instruction is performed per clock cycle;

an architecture that is generally simpler than those of the prior art, resulting in a gain in surface area and a reduction of electrical consumption;

high maximum frequency because of the simplicity of the architecture and the fact that an instruction is carried out in five phases;

very low electrical consumption for there are fewer cycles per instruction and hence fewer unnecessary transitions;

for a provided level of efficiency, it is possible to have a lower clock frequency, resulting in lower electrical consumption and the possibility of lowering the voltage;

the only instruction registers activated are those concerned by the instruction and the associated circuits to perform the instruction;

it is not necessary to carry out a processing of the clock signal unlike in the standard methods that use overlapping phases.

What is claimed is:

1. A microprocessor instruction pipeline having interconnected instruction register stages, the microprocessor comprising:

addressable program memory means for providing instructions at its output;

a plurality of instruction registers forming pipeline stages, each register having an instruction input and a clock input;

means for connecting an instruction output from an instruction register of each stage to an instruction input of an instruction register of a succeeding stage, the loading of instructions between stages being enabled by a clock signal applied to the clock input of a receiving register; and a separate inhibit means located at each stage for enabling a clock applied to the clock input of a correspondingly connected instruction register in response to decoding of the instruction contained in the instruction register of a preceding stage.

2. A microprocessor instruction pipeline according to claim 1, wherein each inhibiting means further comprises:

a decoding circuit having first and second inputs respectively connected to the outputs of a decoding circuit and instruction register of a preceding stage; and gating means connected at a first input thereof to an output of the decoding circuit, and a second input thereof being connected to the clock signal.

3. A microprocessor instruction pipeline according to claim 1 further comprising:

arithmetic and logic means for receiving data;

input register means for receiving data prior to loading of the data into the arithmetic and logic means;

an instruction register of a final stage containing the instruction code of an operation to be performed on the data in the arithmetic and logic means, wherein the signal provided by the inhibiting means associated with instruction register of the final stage is applied to the clock signal input terminal of the input register means for enabling loading of data into the arithmetic and logic means.

4. A microprocessor instruction pipeline according to claim 3 wherein each input register means for the input of data into the arithmetic and logic means comprises:

master registers having data inputs connected to an output of a data memory;

slave registers connected at their inputs to respective outputs of the master registers and having data outputs connected to a data input of the arithmetic and logic means;

means connected between the output of an inhibiting means preceding the final stage and a clock input of the master registers for enabling the master registers to load data from the data memory;

means connected between the output of the inhibiting means at the final stage to a clock input of the slave registers for enabling the slave registers to load data from the master registers.

5. A microprocessor instruction pipeline according to claim 2 wherein each decoding circuit comprises at least two output terminals, each output terminal outputting a decoding signal when an instruction code contained in the instruction register of a preceding stage has a predetermined combination of digits.

* * * * *